United States Patent [19]

Tateishi et al.

[11] Patent Number: 5,035,512
[45] Date of Patent: Jul. 30, 1991

[54] OIL-LEVEL SENSING APPARATUS HAVING A TIME DELAY FUNCTION

[75] Inventors: Yosuke Tateishi, Anjo; Norihisa Takano; Kenji Hashimoto, both of Toyota, all of Japan

[73] Assignee: Aisin Seiki Kabushiki Kaisha, Kariya, Japan

[21] Appl. No.: 536,803

[22] Filed: Jun. 12, 1990

[30] Foreign Application Priority Data

Jul. 18, 1989 [JP] Japan .................... 1-84153

[51] Int. Cl.⁵ .................... G01K 5/62; G05D 23/08
[52] U.S. Cl. .................... 374/142; 73/292; 73/308; 236/48 R; 340/624
[58] Field of Search ................ 73/319, 308, 313, 292; 200/84 C, 84 B; 340/624, 623; 368/114; 236/101 C, 48 R; 374/142

[56] References Cited

U.S. PATENT DOCUMENTS

| | | | |
|---|---|---|---|
| 3,394,687 | 7/1968 | Scott | 236/12.23 |
| 3,483,752 | 12/1969 | Rogen et al. | 116/216 |
| 3,594,675 | 7/1971 | Willson | 116/216 X |
| 3,804,326 | 4/1974 | McIntire | 123/407 X |
| 4,019,678 | 4/1977 | Lord | 236/12.11 |
| 4,068,800 | 1/1978 | Doherty, Jr. | 236/101 C |
| 4,103,265 | 7/1978 | Siiberg | 200/84 C |
| 4,121,763 | 10/1978 | Roberge | 374/205 |
| 4,748,300 | 5/1988 | Anderson | 200/84 C |

Primary Examiner—Daniel M. Yasich
Attorney, Agent, or Firm—Oblon, Spivak, McClelland, Maier & Neustadt

[57] ABSTRACT

An oil level sensing apparatus has a body which defines a volume having an open bottom. A float in the volume supports a permanent magnet and moves within the volume in accordance with the oil level therein. A reed-switch is affected by the magnet supported on the float to detect a low oil level. A temperature sensitive plate closes the open bottom of the volume at low temperatures in order to prevent false readings. Additionally, in order to prevent false readings during transient oil level fluctuations at higher oil temperatures, a spring opposes the opening of the plate such that a restriction is formed in the path for draining oil from the volume. This delays the oil drainage from the chamber and any resulting low oil level signal.

7 Claims, 3 Drawing Sheets

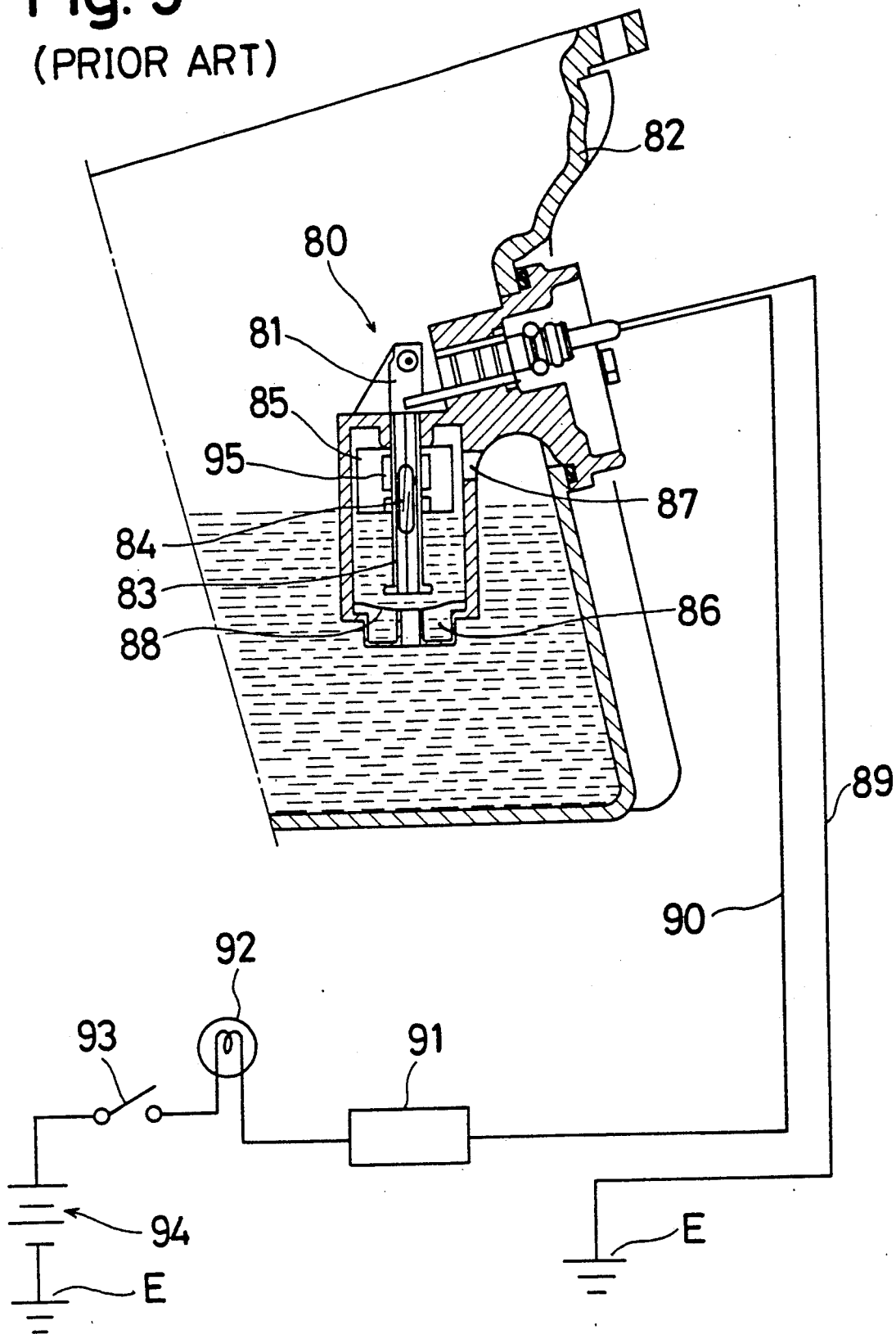

OIL-LEVEL SENSING APPARATUS HAVING A TIME DELAY FUNCTION

BACKGROUND OF THE INVENTION

1. Field of the Invention:

The present invention relates to an oil-level sensing apparatus, and more particularly to an oil-level sensing apparatus in an engine for a motor vehicle.

2. Description of the Related Art

A conventional sensing apparatus for the oil-level in an engine is disclosed in the "MERCEDES BENZ" Service Manual published in 1985 in the U.S.A., and is shown in FIG. 5. Therein, a housing 81 of a sensing apparatus 80 is fixed to an oil-pan 82 of an engine (not shown). A float-guide 83 is fixed to the housing 81, and a reed-switch 84 is inserted therein. A float 85 is located around the float-guide 83, and is moved upwardly or downwardly according to the oil-level in the housing 81. A ring-shaped permanent magnet 95 is fixed in an inner circumferential portion of the float 85.

A first communicating port 86 is formed in the lower portion of the housing 81, and a second communicating port 87 is formed in the upper portion of the housing 81. The communication between the inside of the housing 81 and its outside is established by the first communicating port 86 and the second communicating port 87. Therefore, oil in the oil-pan 82 flows into the housing 81.

The center portion of a plate 88 is fixed to the housing 81 so as to open or close the first communicating port 86. The plate 88 performs a snap-action to open or close the first communicating port according to the temperature of the oil in the housing 81.

A pair of lead-wires 89, 90 are connected with the reed-switch 84. The lead-wire 89 is connected or grounded with the earth E. The lead-wire 90 is connected with the earth E via an electric delay unit 91, an indicator lamp 92, an ignition switch 93 and a power source 94, all of which are connected in series.

In the above oil-level sensing apparatus, when the engine is started by turning on the ignition switch 93 while the temperature of the oil is lower than 60° C., the plate 88 is in a closed state to close the first communicating port 86. Therefore, the oil-level in the housing 81 is not varied even if the oil-level in the oil pan 82 is varied. This is provided due to the fact that when the temperature of the oil is low, the viscosity of oil is high, so that oil slowly circulates in the engine. Thus, the oil-level in the oil pan 82 decreases with time, even though the quantity of the oil does not actually decrease. Therefore, when the temperature of the oil is low, the sensing apparatus 80 does not act.

On the other hand, if the temperature of the oil is higher than 60° C., the outer circumferential portion of the plate 88 opens to open the first communication port 86 (FIG. 5), so that the fluid communication between the inside of the housing 81 and the outside thereof is established.

Therefore, the oil-level in the housing 81 becomes equal to the oil-level in the oil-pan 82. If the oil-level in the oil-pan 82 is sufficiently high, the float 85 is located at an upper portion of the housing 81. Thus, the reed-switch 84 is not influenced by the magnetic flux of the permanent magnet 95 and remains open, so that the indicator lamp 92 is located in the open-circuit and is not turned on.

If the oil-level in the oil-pan 82 is low, the float 85 is located at a lower portion in the housing 81. Thus, the magnetic flux of the permanent magnet 95 brings the reed-switch 84 into a closed condition, and the circuit is closed to thereby light the indicator lamp 92.

If a vehicle (not shown) powered by the engine suddenly starts, stops or turns, the oil-level in the oil-pan 82 is temporarily lowered. The float 85 follows the oil-level, so that the reed-switch 84 is closed. The signal of closure of the reed-switch 84 is delayed about 30 seconds by the electric delay unit 91. After that, if the reed-switch 84 remains closed, the indicator lamp 92 is turned on. Therefore, the indicator lamp 92 is not turned on when the oil-level in the oil-pan 82 is only temporarily lowered. However, the electric delay circuit increases the cost and complexity of the unit.

SUMMARY OF THE INVENTION

It is a primary object to the present invention to provide an oil level sensing apparatus having a time delay function, without providing an electric delay unit.

It is another object of the present invention to provide a time delay for the draining of oil from a volume within the oil level sensing apparatus by forming a restriction in a drain port.

The above, and other objects are achieved according to the present invention by an oil level sensing apparatus comprising means for defining an oil reservoir whose oil level is to be sensed, body means having an open bottom and being provided for defining a volume in the oil reservoir, oil level sensing means in the volume for sensing an oil level in the volume and outputting an oil level signal, temperature sensitive closure means positioned to sense the temperature of the oil in the oil reservoir and being provided for resiliently moving to selectively form and close an opening in the bottom to permit oil in the volume to drain therefrom, and resilient means for opposing the movement of the closure to form the opening. The opening thus forms a restriction which delays the drainage of the oil from the volume at elevated oil temperatures.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a view similar to FIG. 2, but showing a conventional sensing apparatus for an oil-level.

DETAILED DESCRIPTION OF THE PREFERRED EMBODIMENTS

Figure 1:
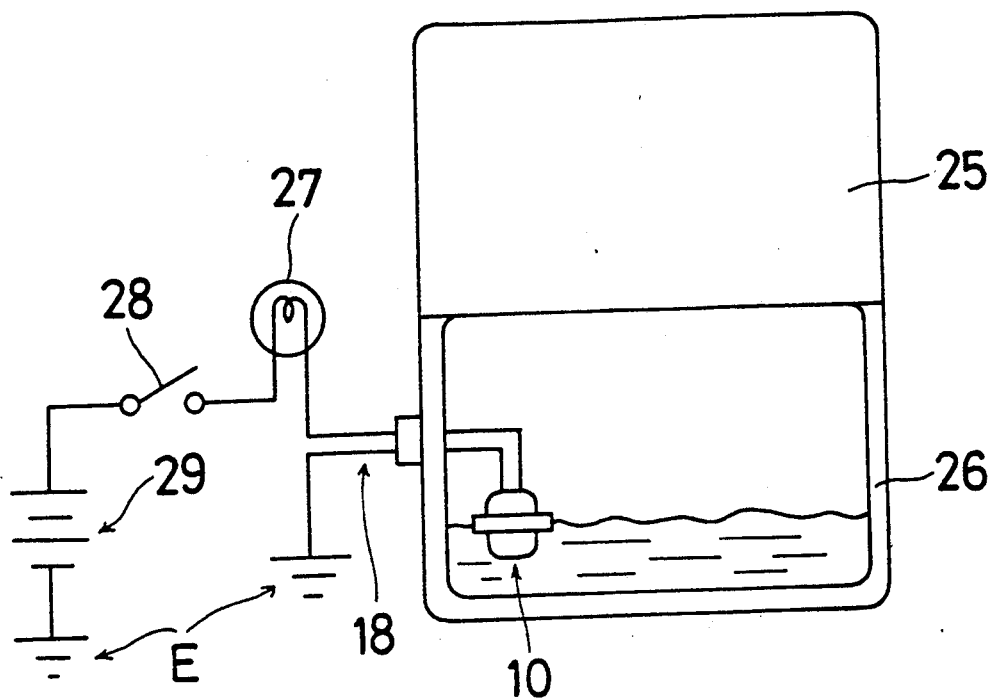
FIG. 1 is a view of schematic overall view of an oil reservoir having a sensing apparatus for an oil-level according to the invention.

Referring first to one embodiment of the present invention as shown in FIG. 1, an oil-level sensing apparatus 10 is fixed in a means for defining an oil reservoir, such as an oil-pan 26 of an engine 25, and is immersed in the lubricating oil in the oil-pan 26. A pair of lead-lines 18 extend from the sensing apparatus 10, and one of the lead-lines 18 is connected to a earth E. An indicator-lamp 27, an ignition-switch 28 and a battery 29 are located on the other of the lead-lines 18.

Figure 2:
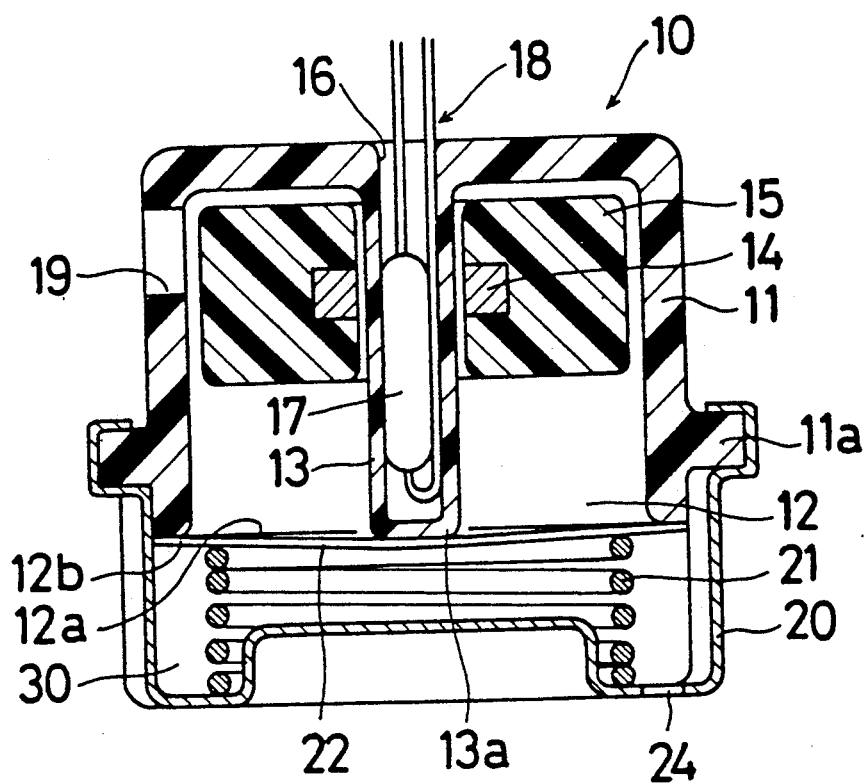
FIG. 2 is a cross-sectional view of the sensing apparatus according to FIG. 1.
Figure 3:
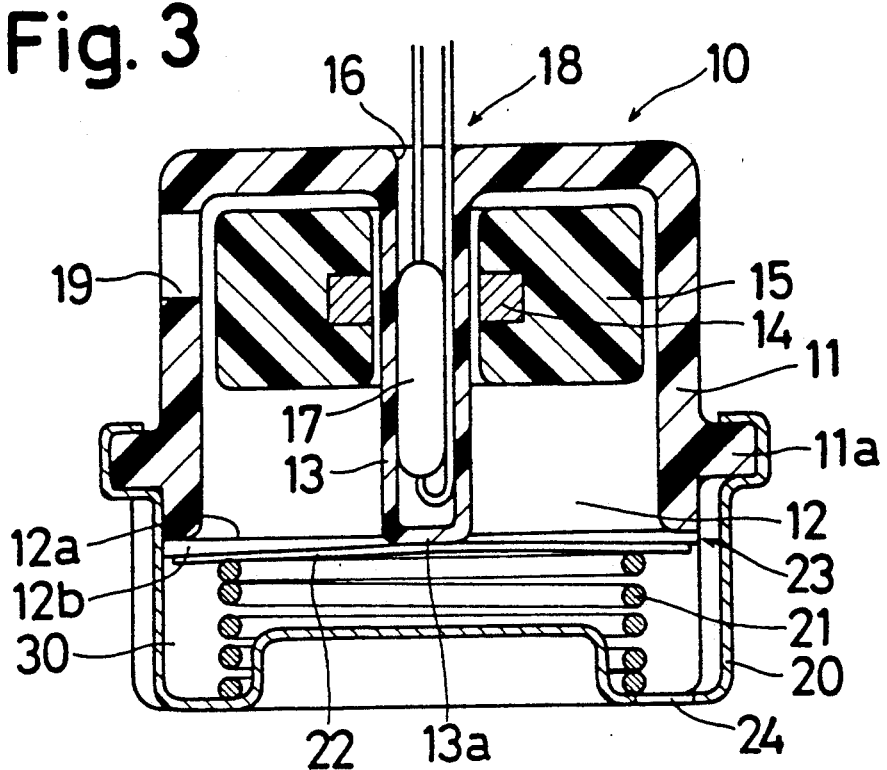
FIG. 3 is a view similar to FIG. 2, but showing the sensing apparatus in another condition.

Referring FIGS. 2-3, a detailed construction of the oil-level sensing apparatus 10 is illustrated. A body 11 has a communicating port 19, is made from, for example, resin and defines a volume 12. It includes oil level sensing means including a guide 13 and a float 15 having held therein a permanent magnet 14 and loosely mounted on the guide 13 so as to be movable therealong. A depression 16 is formed in the guide 13, and a reed-switch 17 is inserted into the depression 16. The lead-lines 18 extend from the reed-switch 17.

A cover 20 is fixed to a flange portion 11a of the body 11, has a communication port 24 and defines a volume 30. A temperature sensitive means such bimetal plate 22 which can perform a snap-action is located on an open bottom 12a of the volume 12, and can contact with, or part from, a sealing-face 12b of the volume 12 to form a closure which can open or close communication between the volume 12 and the volume 30. A spring 21 is interposed between the cover 20 and the bimetal plate 22 to comprise a resilient means for opposing the movement of the closure away from the sealing face 12b.

The operation according to the above mentioned embodiment is described hereinafter:

When the engine 25 starts, the temperature of the lubricating oil is low. Therefore, the bimetal plate 22 closes a sealing-face 12b, so that the communication between the volume 12 and the volume 30 is interrupted by the bimetal plate 22 (FIG. 2).

Now, if the oil-level of the cold lubricating oil in the oil-pan 26 is sufficiently high, both the volume 12 and the volume 30 are filled with the lubricating oil via the communicating ports 19 and 24, respectively. Thus, the float 15 is located at a high position in the volume 12 and the magnetic flux of the permanent magnet 14 does not influence the reed-switch 17 to close. Consequently, the indicator lamp 27 is not turned on.

If the engine 25 is subjected to a sudden acceleration, e.g., a vehicle powered by the engine 25 suddenly starts, stops or turns, the oil-level in which the sensing apparatus 10 is immersed in the oil-pan 26 is temporarily lowered. The lubricating oil in the volume 30 flows out to the oil-pan 26 via the communicating port 24, but the lubricating oil in the volume 12 does not flow out to the oil-pan 26 since the plate 22 is closed. Therefore, the float 15 does not move downwardly, and the indicator lamp 27 is not turned on.

That is, the lubricating oil in the volume 12 does not flow out of the oil-pan 26 because the bimetal plate 22 closes the sealing-face 12b. Consequently, the sensing apparatus 10 does not incorrectly indicate a low oil level.

On the other hand, if the oil-level of the lubricating oil in the oil-pan 26 is low when the engine 25 first starts, the float is located at low position in the volume 12 and the magnetic flux of the permanent magnet 14 influences the reed-switch 17 to close even though the plate 22 is closed. Consequently, the indicator lamp 27 is turned on.

Next, as the engine 25 becomes hot, (FIG. 3), the temperature of the lubricating oil becomes high. The bimetal plate 22 then performs a snap-action according to the increased temperature of the lubricating oil. An outer circumferential portion of the bimetal plate 22 then slightly separates from the sealing-face 12b to form the annular opening 23. However, the degree of opening of the bimetal plate 22 is limited by the opposition of the spring 21. That is, when the bimetal plate 22 snaps over it applies a downward spring force on the spring 21. The bimetal plate 22 will therefore only snap over by a degree such that its spring force equals that of spring 21. Thus, by selecting the spring forces of the bimetal plate 22 and the spring 21, a restriction having a predetermined area can be created at the opening 23. This predetermined area can be selected such that the oil will drain from the volume 12 with a desired delay corresponding to the delay provided by the circuit 91 of the conventional device of FIG. 5.

Now, if the oil-level of the hot lubricating oil in the oil-pan 26 is sufficiently high and if the engine 25 is suddenly accelerated, the oil-level of the oil in which the sensing apparatus 10 is being immersed in the oil-pan 26 is temporarily lowered. However, the lubricating oil in the volume 12 only slowly flows out via the restriction defined by the opening 23 to the volume 30 and the communicating port 24 because the opening area of the opening 23 is small. Therefore, before the float 15 moves downwardly the lubricating oil again flows into the volume 12 via the communicating port 19. Consequently, the sensing apparatus 10 does not incorrectly sense a low oil level.

The above embodiment has many advantages. For example, an electric delay unit is not needed.

Figure 4:
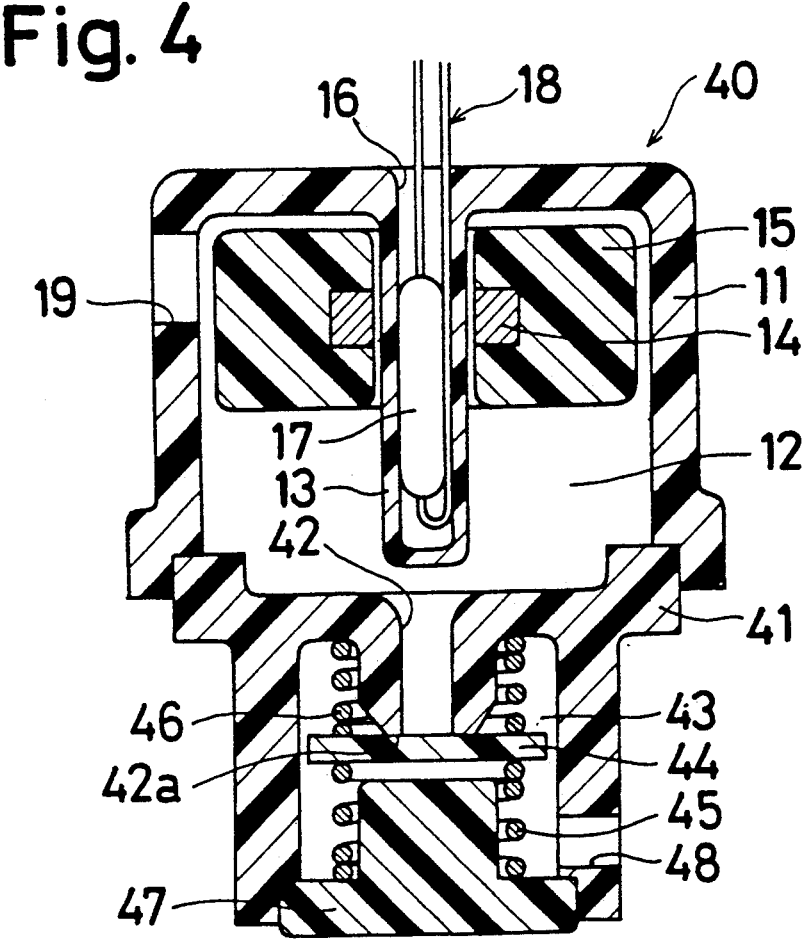
FIG. 4 is a view similar to FIG. 2, but showing another embodiment.

Next, referring to FIG. 4 which shows a sensing apparatus of a second embodiment according to the present invention, only the construction different from the first embodiment will be described hereinafter.

A cover 41 is made from, for example, resin and has a passage 42, a volume 43, a sealing-face 42a and a communicating port 48. A plate 44 can contact with or part from the sealing-face 42a to form the restricted opening. A cover 47 is fixed to the cover 41. A spring 45 is interposed between the plate 44 and the cover 47. A material having a temperature sensitive shape, such as a spring 46 which is made from a shape memory effect alloy, is interposed between the upper portion of the volume 43 and the plate 44 and cooperates with the plate to define a temperature sensitive closure means. The other elements are the same as in the first embodiment.

The operation of the sensing apparatus 40 according to the second embodiment is generally the same as that described with reference to FIGS. 2-3, so that only the differences in operation will be described.

When the engine 25 is cold, the urging force of the spring 45 is greater than that of the spring 46. Thus, the plate 44 closes the passage 42.

When the engine 25 is hot, the shape memory effect of the alloy forming the spring 46 results in the urging force of the spring 45 balancing that of the spring 46, so that the plate 44 slightly opens the sealing-face 42a. Again, the opening is restricted by the spring 45 to create a restriction to flow out of volume 12.

The advantages according to the first embodiment are also realized for the second embodiment.

Obviously, numerous modifications and variations of the present invention are possible in light of the above teachings. It is therefore to be understood that within the scope of the appended claims, the invention may be practiced otherwise than a specifically described herein.

What is claimed as new and desired to be secured by Letters Patent of the U.S. is:

1. An oil level sensing apparatus comprising:

means for defining an oil reservoir whose oil level is to be sensed;

body means for defining a volume in said oil reservoir, said body means having an open bottom;

oil level sensing means in said volume for sensing an oil level in said volume and outputting an oil level signal;

temperature sensitive closure means positioned to sense the temperature of the oil in the oil reservoir and being provided for resiliently moving to selectively form and close an opening in said open bottom to permit oil in said volume to drain therefrom at elevated oil temperatures; and resilient means for opposing the movement of said closure to selectively form said opening, whereby said opening defines a restriction and the draining of oil from said volume is delayed.

2. The apparatus of claim 1 wherein said means for defining an oil reservoir comprises an engine oil pan.

3. The apparatus of claim 1 wherein said oil level sensing means comprises:

a vertical guide extending into said volume;

a reed-switch in said guide; and a float having a magnet and movable on said guide, whereby the magnet influences the reed-switch to close when a predetermined oil level exists in said volume.

4. The apparatus of claim 1 wherein said temperature sensitive closure means is comprised by a bimetal plate and said resilient means for opposing comprises a spring bearing on said bimetal plate.

5. The apparatus of claim 1 wherein said temperature sensitive closure means comprises a plate and a spring having a temperature sensitive shape and bearing on said plate in a direction for forming said opening, and wherein said means for opposing comprises a spring bearing on said plate in a direction opposite said spring having a temperature sensitive shape.

6. The apparatus of claim 5 wherein said spring having a temperature sensitive shape is formed of a shape memory effect alloy.

7. The apparatus of claim 1 including a port formed in an upper portion of said body means.

* * * * *